United States Patent
Barone et al.

(10) Patent No.: US 11,248,667 B2
(45) Date of Patent: Feb. 15, 2022

(54) METHOD TO CONTROL A ROAD VEHICLE WITH A MICROSLIP OF THE CLUTCH

(71) Applicant: FERRARI S.p.A., Modena (IT)

(72) Inventors: Alessandro Barone, Bologna (IT);
Andrea Nannini, Modena (IT);
Giacomo Senserini, Modena (IT);
Stefano Marconi, Modena (IT)

(73) Assignee: FERRARI S.P.A., Modena (IT)

(*) Notice: Subject to any disclaimer, the term of this patent is extended or adjusted under 35 U.S.C. 154(b) by 0 days.

(21) Appl. No.: 17/026,693

(22) Filed: Sep. 21, 2020

(65) Prior Publication Data
US 2021/0095726 A1 Apr. 1, 2021

(30) Foreign Application Priority Data

Sep. 30, 2019 (IT) .................... 102019000017531

(51) Int. Cl.
*F16D 48/06* (2006.01)
(52) U.S. Cl.
CPC ...... *F16D 48/06* (2013.01); *F16D 2500/3065* (2013.01); *F16D 2500/3067* (2013.01); *F16D 2500/30406* (2013.01); *F16D 2500/30806* (2013.01); *F16D 2500/3125* (2013.01); *F16D 2500/50287* (2013.01); *F16D 2500/70426* (2013.01); *F16D 2500/70626* (2013.01)
(58) Field of Classification Search
None
See application file for complete search history.

(56) References Cited

U.S. PATENT DOCUMENTS

| | | | |
|---|---|---|---|
| 6,405,844 B1* | 6/2002 | Takamatsu ........... | B60K 28/165 192/103 F |
| 2003/0183031 A1 | 10/2003 | Shimaguchi | |
| 2004/0059494 A1* | 3/2004 | Yoneda .................. | B60K 23/04 701/89 |
| 2005/0107215 A1* | 5/2005 | Werner ................. | B60W 10/02 477/174 |
| 2018/0180168 A1 | 6/2018 | Peterson et al. | |

FOREIGN PATENT DOCUMENTS

JP    2001146928 A    5/2001

OTHER PUBLICATIONS

Search Report issued in Italian Patent Application No. 201900017531, completed Mar. 30, 2020; 8 pages.

* cited by examiner

*Primary Examiner* — Timothy Hannon
(74) *Attorney, Agent, or Firm* — Cantor Colburn LLP

(57) ABSTRACT

A method to control a road vehicle provided with a clutch, which connects an internal combustion engine to drive wheels and is arranged upstream of a servo-assisted transmission; the control method comprises the steps of: checking whether the tyres of the drive wheels are close to a grip limit; and opening the clutch so that the clutch transmits a torque to the drive wheels with a slip of the clutch that is constant and other than zero when the tyres of the drive wheels are close to the grip limit.

13 Claims, 3 Drawing Sheets

METHOD TO CONTROL A ROAD VEHICLE WITH A MICROSLIP OF THE CLUTCH

CROSS-REFERENCE TO RELATED APPLICATIONS

This patent application claims priority from Italian Patent Application No. 102019000017531 filed on Sep. 30, 2019, the entire disclosure of which is incorporated herein by reference.

TECHNICAL FIELD

The invention relates to a method to control a road vehicle.

The invention finds advantageous application in a drivetrain provided with a dual-clutch, servo-assisted transmission, to which explicit reference will be made in the description below without because of this loosing in generality.

PRIOR ART

A drivetrain provided with a dual-clutch, servo-assisted transmission comprises a pair of primary shafts, which are coaxial to one another, are independent of one another and are inserted inside one another; two coaxial clutches, each designed to connect a respective primary shaft to a drive shaft of an internal combustion engine; and at least one secondary shaft, which transmits the motion to the drive wheels and can be coupled to the primary shafts by means of respective gear trains, each defining a gear.

During a gear shift, the current gear couples the secondary shaft to a primary shaft, while the following gear couples the secondary shaft to the other primary shaft; as a consequence, the gear shift takes place by crossing the two clutches, namely by opening the clutch associated with the current gear and by simultaneously closing the clutch associated with the following gear.

It was found out that, when the tyres of the drive wheels are close to the grip limit (usually when a low gear is engaged in the transmission and the grip of the road surface is scarce, for example due to the presence of water), a phenomenon known as "stick-slip" can frequently occur, which is characterized by continuous and successive grip losses and recoveries; in other words, along a short segment the tyre of a drive wheel has a grip on the ground, along the following segment the tyre looses grip and slips, along a further following segment the tyre recovers grip and so on.

Said phenomenon known as "stick-slip" is negative for it triggers, in the drivetrain, oscillations that are transmitted to the internal combustion engine, which, in turn, transfers them to the frame through the buffers with which the internal combustion engine is fixed to the frame. The oscillations triggered by the phenomenon known as "stick-slip" almost always cause a metal noise, which is particularly annoying for drivers (since it makes it sound like there is something broken in the road vehicle); furthermore, in some particularly unfortunate conditions, the oscillations triggered by the phenomenon known as "stick-slip" can be amplified by structural resonances, which generate torque peaks that can damage the components of the drivetrain and of the internal combustion engine (generating fatigue breaks after a given amount of time or also generating sudden breaks following a particularly intense impulsive stress).

Patent application US2003183031A1 describes an automatic transmission in which the movement of the vehicle can be started in a forward or in a backward direction and in which the vehicle driving mode suited for a slippery road can be reached in an automatic manner. To this aim there are provided: a drive wheel slip detector to detect whether the drive wheel slips; a sub-clutch to engage one of the gear trains other than the first gear and reverse gear trains; and a controller to connect the sub-clutch when a shift position is in the first gear or in reverse and when the drive wheel slip detector detects that the drive wheel is slipping.

DESCRIPTION OF THE INVENTION

The object of the invention is to provide a method to control a road vehicle, said method avoid the negative consequences of the above-mentioned phenomenon known as "stick-slip" and, at the same time, being easy and economic to be implemented.

According to the invention, there is provided a method to control a road vehicle according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
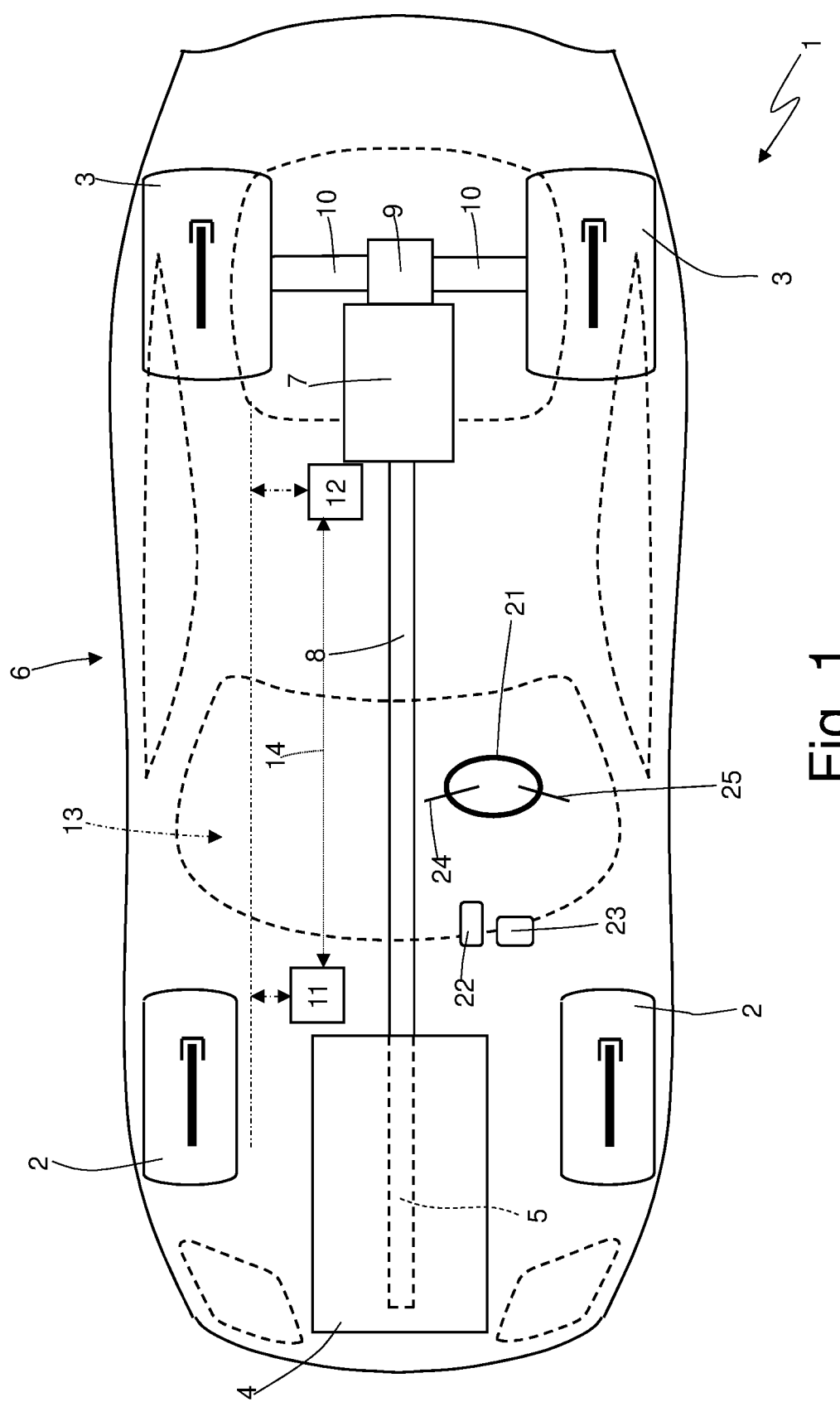
FIG. 1 is a schematic plan view of a rear-wheel drive road vehicle provided with a drivetrain with a dual-clutch, servo-assisted transmission, which is controlled according to the control method of the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which is provided with a drive shaft 5, which produces a torque, which is transmitted to the drive wheels 3 by means of a drivetrain 6. The drivetrain 6 comprises a dual-clutch, servo-assisted transmission 7 arranged in the rear-wheel-drive assembly and a transmission shaft 8, which connects the drive shaft 5 to an input of the dual-clutch, servo-assisted transmission 7. The dual-clutch, servo-assisted transmission 7 is connected, in a train-like manner, to a self-locking differential 9, from which a pair of axle shafts 10 start, each integral to a drive wheel 3.

The road vehicle 1 comprises a control unit 11 of the engine 4, which controls the engine 4, a control unit 12 of the drivetrain 6, which controls the drivetrain 6, and a BUS line 13, which is manufactured, for example, according to the CAN (Car Area Network) protocol, extends to the entire road vehicle 1 and allows the two control units 11 and 12 to communicate with one another. In other words, the control unit 11 of the engine 4 and the control unit 12 of the drivetrain 6 are connected to the BUS line 13 and, therefore, can communicate with one another by means of messages sent through the BUS line 13. Furthermore, the control unit 11 of the engine 4 and the control unit 12 of the drivetrain 6 can be directly connected to one another by means of a dedicated synchronization cable 14, which is capable of directly transmitting a signal from the control unit 12 of the drivetrain 6 to the control unit 11 of the engine 4 without the delays caused by the BUS line 13. Alternatively, the synchronization cable 14 could be absent and all communications between the two control units 11 and 12 could be exchanged using the BUS line 13.

Figure 2:
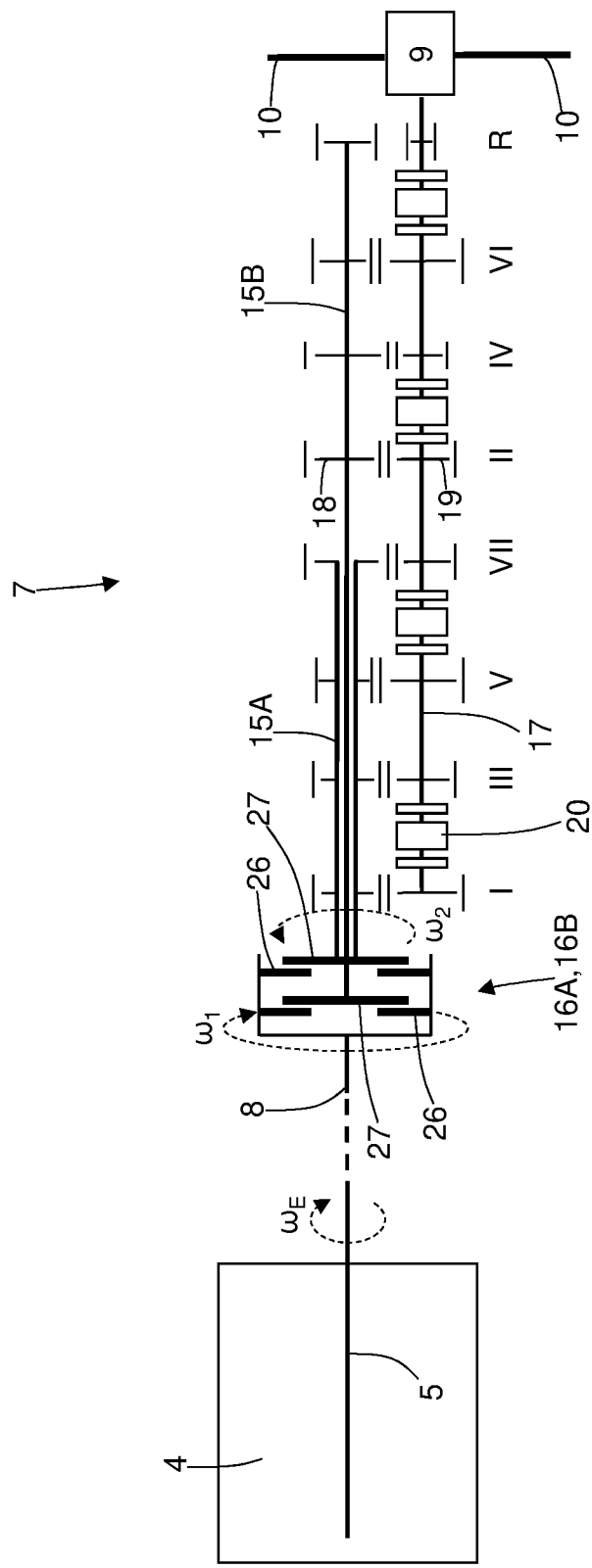
FIG. 2 is a schematic view of the drivetrain of FIG. 1.

According to FIG. 2, the dual-clutch, servo-assisted transmission 7 comprises a pair of primary shafts 15, which are coaxial to one another, independent of one another and inserted inside one another. Furthermore, the dual-clutch, servo-assisted transmission 7 comprises two coaxial clutches 16, each designed to connect a respective primary shaft 15 to the drive shaft 5 of the internal combustion engine 4 through the interposition of the transmission shaft 8; each clutch 16 is an oil bath clutch and, hence, is pressure-controlled (i.e. the degree of opening/closing of the clutch 16 is determined by the pressure of the oil inside the clutch 16); according to an alternative embodiment, each clutch 16 is a dry clutch and, hence, is position-controlled (i.e. the degree of opening/closing of the clutch 16 is determined by the position of a movable element of the clutch 16). The dual-clutch, servo-assisted transmission 7 comprises one single secondary shaft 17 connected to the differential 9 that transmits the motion to the drive wheels 3; according to an alternative and equivalent embodiment, the dual-clutch, servo-assisted transmission 7 comprises two secondary shafts 17, both connected to the differential 9.

The dual-clutch, servo-assisted transmission 7 has seven forward gears indicated with Roman numerals (first gear I, second gear II, third gear III, fourth gear IV, fifth gear V, sixth gear VI and seventh gear VII) and a reverse gear (indicated with R). The primary shaft 15 and the secondary shaft 17 are mechanically coupled to one another by a plurality of gear trains, each defining a respective gear and comprising a primary gear wheel 18 fitted on the primary shaft 15 and a secondary gear wheel 19 fitted on the secondary shaft 17. In order to allow for a correct operation of the dual-clutch, servo-assisted transmission 7, all odd gears (first gear I, third gear III, fifth gear V, seventh gear VII) are coupled to a same primary shaft 15, whereas all even gears (second gear II, fourth gear IV and sixth gear VI) are coupled to the other primary shaft 15.

Each primary gear wheel 18 is splined to a respective primary shaft 15, so as to always rotate with the primary shaft 15 in an integral manner, and permanently meshes with the respective secondary gear wheel 19; on the other hand, each secondary gear wheel 19 is mounted on the secondary shaft 17 in an idle manner. Furthermore, the dual-clutch, servo-assisted transmission 7 comprises four synchronizers 20, each mounted coaxial to the secondary shaft 17, arranged between two secondary gear wheels 19 and designed to be operated so as to alternatively fit the two respective secondary gear wheels 19 to the secondary shaft 17 (i.e. so as to alternatively cause the two respective secondary gear wheels 19 to become angularly integral to the secondary shaft 17). In other words, each synchronizer 20 can be moved in one direction to fit a secondary gear wheel 19 to the secondary shaft 17 or can be moved in the other direction to fit the other secondary gear wheel 19 to the secondary shaft 17.

The dual-clutch transmission 7 comprises one single secondary shaft 17 connected to the differential 9 that transmits the motion to the drive wheels 3; according to an alternative and equivalent embodiment, the dual-clutch transmission 7 comprises two secondary shafts 17, both connected to the differential 9.

According to FIG. 1, the road vehicle 1 comprises a passenger compartment housing a driving position for the driver; the driving position comprises a seat (which is not shown), a steering wheel 21, an accelerator pedal 22, a brake pedal 23 and two paddle shifters 24 and 25, which control the dual-clutch, servo-assisted transmission 7 and are connected to the opposite sides of the steering wheel 21. The upshift paddle shifter 24 is operated by the driver (by means of a short pressure) in order to request an upshift (namely, the engagement of a new gear, which is higher than the current gear and contiguous with the current gear), whereas the downshift paddle shifter 25 is operated by the driver (by means of short pressure) in order to request a downshift (namely, the engagement of a new gear, which is lower than the current gear and is contiguous with the current gear).

In use, the control unit 12 of the drivetrain 6 checks whether the tyres of the drive wheels 3 are close to a grip limit and then (slightly) opens the clutch 16 so that the clutch 16 transmits a torque to the drive wheels 3 with a constant slip of the clutch 16 other than zero. In other words, due to said slip, a driving disc 26 of the clutch 16 (schematically shown in FIG. 2) has a rotation speed $\omega_1$ which is greater than a rotation speed $\omega_2$ of a driven disc 27 of the clutch 16 (schematically shown in FIG. 2); therefore, the slip of the clutch 16 is (in absolute value) equal to the difference between the rotation speed $\omega_1$ of the driving disc 26 of the clutch 16 and the rotation speed $\omega_2$ of the driven disc 27 of the clutch 16.

Generally speaking, the slip of the clutch 16 (namely, the difference between the rotation speed $\omega_1$ of the driving disc 26 and the rotation speed $\omega_2$ of the driven disc 27) ranges, in absolute value, between 70 and 180 rotations/minute and ranges, in relative value, between 0.5% and 1.2% of a rotation speed $\omega_E$ of the internal combustion engine 4. Hence, if the tyres of the drive wheels 3 are close to a grip limit, the clutch 16 is controlled so as to pursue a target slip $S_T$ of the clutch 16, which is generally established during the designing phase, is stored in a memory of the control unit 12 of the drivetrain 6, ranges, in absolute value, between 70 and 180 rotations/minute and ranges, in relative value, between 0.5% and 1.2% of a rotation speed $\omega_E$ of the internal combustion engine 4. According to a possible embodiment, the target slip $S_T$ of the clutch 16 could not always be constant, but it could change depending on the gear engaged in the servo-assisted transmission 7, depending on the rotation speed $\omega_E$ of the internal combustion engine 4 and/or depending on the torque $T_E$ generated by the internal combustion engine 4; in this case, in a memory of the control unit 12 of the drivetrain 6 there is stored a map (normally experimentally refined by means of road tests), which provides the value of the target slip $S_T$ of the clutch 16.

The control unit 12 of the drivetrain 6 considers that the tyres of the drive wheels 3 are close to the grip limit if three conditions occur simultaneously:

1. in the servo-assisted transmission 7, a gear is engaged, which belongs to a predetermined set of gears (comprising the lowest gears, namely, generally speaking, the first gear I, the second gear II and the third gear III);
2. the rotation speed $\omega_E$ of the internal combustion engine 4 is comprised in a predetermined speed range (for example, between 4,000 and 8,000 revolutions/minute); and
3. a torque $T_E$ generated by the internal combustion engine 4 exceeds a torque threshold value.

According to a possible embodiment, the torque threshold value is always constant. Alternatively, the control unit 12 of the drivetrain 6 could determine a degree of grip of a road surface on which the road vehicle 1 rests and, therefore, it could determine, every single time, the torque threshold value based on the degree of grip of the road surface;

generally speaking, the information on the degree of grip is available over the BUS line 13, since it is estimated (in a known manner) and shared by a brake control unit.

Figure 3:
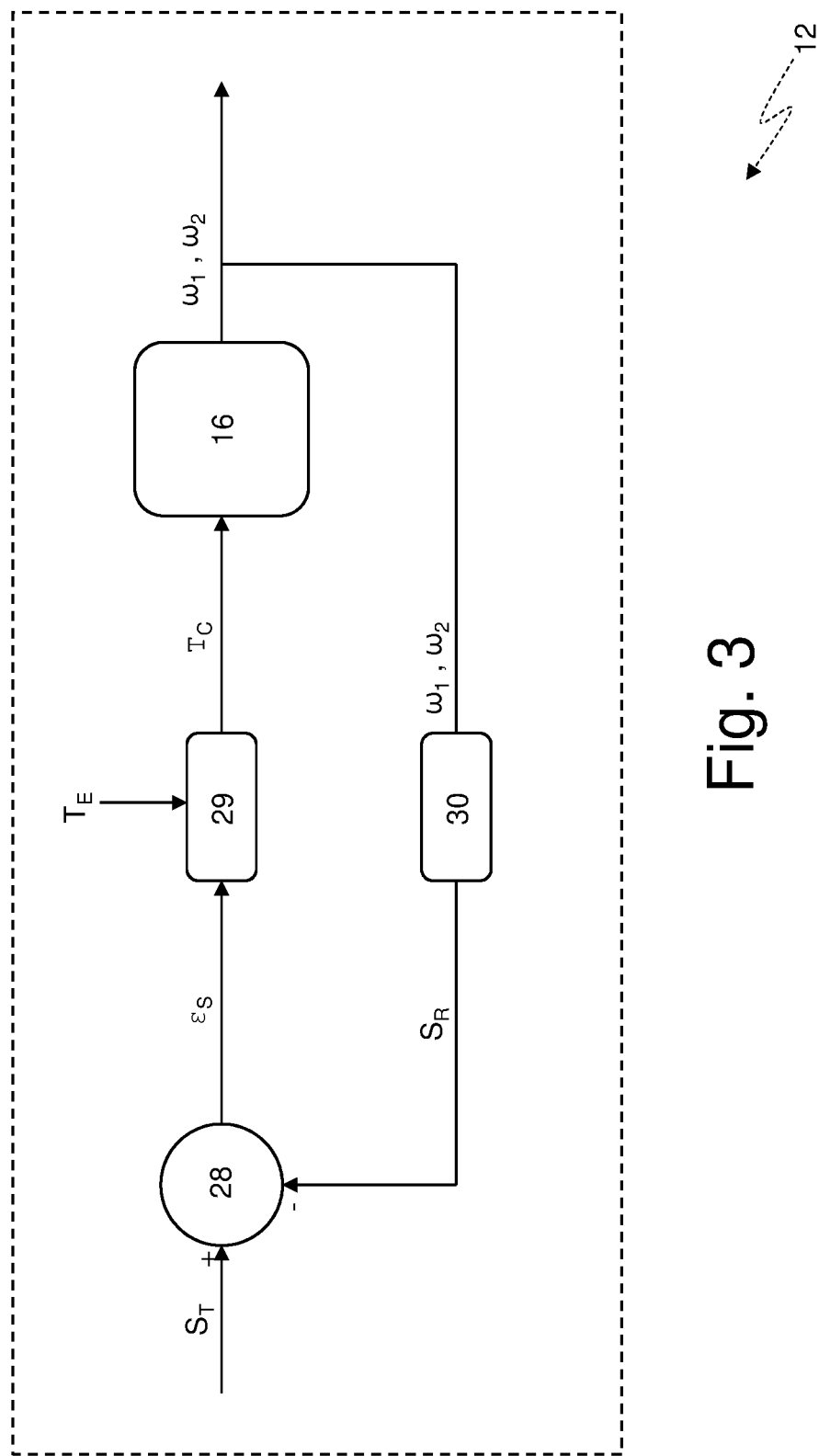
FIG. 3 is a block diagram of a control logic implemented in a control unit of the drivetrain.

According to a possible embodiment which is schematically shown in FIG. 3, the control unit 12 of the drivetrain 6 determines a target slip $S_T$ of the clutch 16, cyclically determines a real slip $S_R$ of the clutch 16, detects the torque $T_E$ generated by the internal combustion engine 4, establishes a clutch torque $T_C$, which has to be transmitted by the clutch 16 and is (slightly) smaller than the engine torque $T_E$, controls the clutch 16 so as to transmit the clutch torque $T_C$, and cyclically changes the clutch torque $T_C$ depending on a difference between the target slip $S_T$ of the clutch 16 and the real slip of the $S_R$ of the clutch 16.

In other words, the control unit 12 of the drivetrain 6 changes the clutch torque $T_C$ so as to pursue the target slip $S_T$ of the clutch 16, namely so that the clutch 16 always has the target slip $S_T$.

It should be pointed out that the clutch torque $T_C$ is converted into a corresponding pressure value by means of a conversion chart (known beforehand), since the clutches 16 are controlled based on the pressure (of the oil).

According to the preferred embodiment shown in FIG. 3, the control unit 12 of the drivetrain 6 implements a feedback control to modulate the clutch torque $T_C$; in the feedback control, the control error $\varepsilon_S$ is equal to the difference between the target slip $S_T$ of the clutch 16 and the real slip $S_R$ of the clutch 16. In particular, the feedback control entails the use of a subtracter block 28, which calculates the control error $\varepsilon_S$ carrying out the difference between the target slip $S_T$ of the clutch 16 and the real slip $S_R$ of the clutch 16, and also entails the use of a PID controller 29, which receives, as an input, the control error $\varepsilon_S$ and provides, as an output, the clutch torque $T_C$ with which to control the clutch 16. According to FIG. 3, a calculation block 30 is provided, which calculates the real slip $S_R$ of the clutch 16 carrying out the difference between the rotation speed $\omega_1$ of the driving disc 26 and the rotation speed $\omega_2$ of the driven disc 27.

The PID controller 29 also receive the engine torque $T_E$ generated by the internal combustion engine 4, since the clutch torque $T_C$ is determined starting from the engine torque $T_E$; indeed, the clutch torque $T_C$ must be (slightly) smaller than the engine torque $T_E$.

In other words, the control mode described above entails managing the real slip $S_R$ of the clutch 16 with micro-variations of the clutch torque $T_C$, keeping the engine torque $T_E$ generated by the internal combustion engine 4 constant (obviously, as long as the action of the driver upon the accelerator pedal 22 is constant). This control mode (which involves the sole clutch 16 and not the internal combustion engine 4) is effective (namely, is capable of having the clutch 16 always work in a small neighbourhood of the target slip $S_T$), but, on the other hand, tends to transmit to the drive wheels 3 an oscillating torque (since the clutch torque $T_C$ transmitted by the clutch is continuously variable), which could cause longitudinal oscillations in the motion of the road vehicle 1, which can be perceived by the driver.

In order to avoid this drawback (i.e. in order to keep the torque transmitted to the drive wheels 3 more constant), the control unit 12 of the drivetrain 6 could operate differently, namely the control unit 12 of the drivetrain 6 determines the target slip $S_T$ of the clutch 16, detects the engine torque $T_E$ generated by the internal combustion engine 4, establishes the clutch torque $T_C$, which has to be transmitted by the clutch 16 and is equal to the engine torque $T_E$ (and, hence, is constant as long as the driver does not act upon the accelerator pedal 22 in a different manner), controls the clutch 16 so as to transmit the clutch torque $T_C$ (which is kept constant as long as the driver does not act upon the accelerator pedal 22 in a different manner), detects the rotation speed $\omega_2$ of the driven disc 27 of the clutch 16, determines a target rotation speed $\omega_{1-T}$ of the driving disc 26 of the clutch 16 by adding the target slip $S_T$ of the clutch 16 to the rotation speed $\omega_2$ of the driven disc 27 of the clutch 16, and controls the internal combustion engine 4 so as to change (with micro-variations) the engine torque $T_E$ generated by the internal combustion engine 4 so as to pursue the target rotation speed $\omega_{1-T}$ of the driving disc 26 of the clutch 16.

In other words, this alternative operating mode described above entails managing the real slip $S_R$ of the clutch 16 with micro-variations of the engine torque $T_E$ generated by the internal combustion engine 4, keeping the clutch torque $T_C$ constant (obviously, as long as the action of the driver upon the accelerator pedal 22 is constant).

The control method described above has different advantages.

First of all, the control method described above avoids the negative consequences of the phenomenon called "stick-slip" (which cannot be avoided, per se, in certain conditions), since the torque oscillations introduced in the drivetrain 6 by the phenomenon known as "stick-slip" are blocked by the clutch 16, which operates with a given constant slip other than zero; in other words, when the clutch 16 operates with a given constant slip other than zero, the clutch 16 acts like a mechanical low-pass filter, which effectively and efficiently blocks the torque oscillations introduced in the drivetrain 6 by the phenomenon called "stick-slip". As a consequence, the torque oscillations introduced in the drivetrain 6 by the phenomenon known as "stick-slip" stop in the clutch 16 and are not transmitted (if not in a marginal manner and without consequences) to the internal combustion engine 4.

Furthermore, the control method described above is easy and economic to be implemented as its execution requires a limited memory space and a reduced calculation ability.

LIST OF THE REFERENCE NUMBERS OF THE FIGURES 1 road vehicle
2 front wheels
3 rear wheels
4 engine
5 drive shaft
6 drivetrain
7 transmission
8 transmission shaft
9 differential
10 axle shafts
11 engine control unit
12 drivetrain control unit
13 BUS line
14 synchronization cable
15 primary shafts
16 clutches
17 secondary shaft
18 primary gear wheel
19 secondary gear wheel
20 synchronizers
21 steering wheel
22 accelerator pedal
23 brake pedal
24 upshift paddle shifter 25 downshift paddle shifter
26 driving disc
27 driven disc
28 subtracter block
29 PID controlled
30 calculation block
$\omega_1$ rotation speed
$\omega_2$ rotation speed
$\omega_E$ rotation speed
$S_R$ real slip
$S_T$ target slip
$\varepsilon_S$ control error
$T_C$ clutch torque
$T_E$ engine torque

The invention claimed is:

1. A method to control a road vehicle (1) provided with a clutch (16), which connects an internal combustion engine (4) to drive wheels (3) and is arranged upstream of a servo-assisted transmission (7); the control method comprises the steps of:
checking whether tyres of the drive wheels (3) are close to a grip limit; and
opening the clutch (16) so that the clutch (16) transmits a torque to the drive wheels (3) with a slip of the clutch (16) that is constant and other than zero when the tyres of the drive wheels (3) are close to the grip limit;
wherein the tyres of the drive wheels (3) are considered close to the grip limit if: in the servo-assisted transmission (7), a gear is engaged, which belongs to a predetermined set of gears; and a torque ($T_E$) generated by the internal combustion engine (4) exceeds a torque threshold value.

2. The control method according to claim 1, wherein, due to the slip, a driving disc (26) of the clutch (16) has a rotation speed ($\omega_1$) which is greater than a rotation speed ($\omega_2$) of a driven disc (27) of the clutch (16).

3. The control method according to claim 2, wherein a difference between the rotation speed ($\omega_1$) of the driving disc (26) and the rotation speed ($\omega_2$) of the driven disc (27) ranges from 70 to 180 revolutions/minute.

4. The control method according to claim 2, wherein a difference between the rotation speed ($\omega_1$) of the driving disc (26) and the rotation speed ($\omega_2$) of the driven disc (27) ranges from 0.5% to 1.2% of a rotation speed ($\omega_E$) of the internal combustion engine (4).

5. The control method according to claim 1, wherein the tyres of the drive wheels (3) are also considered close to the grip limit if a rotation speed ($\omega_E$) of the internal combustion engine (4) is comprised in a predetermined range of speeds.

6. The control method according to claim 1 and comprising the further steps of:
determining a degree of grip of a road surface on which the road vehicle (1) rests; and
determining the torque threshold value depending on the degree of grip of the road surface.

7. The control method according to claim 1 and comprising the further steps of:
determining a target slip ($S_T$) of the clutch (16);
detecting an engine torque ($T_E$) generated by the internal combustion engine (4);
establishing a clutch torque ($T_C$), which has to be transmitted by the clutch (16); and
controlling the clutch (16) so as to transmit the clutch torque ($T_C$).

8. The control method according to claim 7, wherein the target slip ($\omega_E$) of the clutch (16) is read from a memory of a control unit (12) of the drivetrain (6).

9. The control method according to claim 7 and comprising the further steps of:
cyclically determining a real slip of the ($S_R$) of the clutch (16);
establishing the clutch torque ($T_C$), which has to be transmitted by the clutch (16) and is smaller than the engine torque ($T_E$); and
cyclically changing the clutch torque ($T_C$) depending on a difference between the target slip ($S_T$) of the clutch (16) and the real slip of the ($S_R$) of the clutch (16).

10. The control method according to claim 9, wherein the clutch torque ($T_C$) is changed so as to pursue the target slip ($S_T$) of the clutch (16).

11. The control method according to claim 9, wherein the clutch torque ($T_C$) is modulated by means of a feedback control in which a control error ($\varepsilon_S$) is the difference between the target slip ($S_T$) of the clutch (16) and the real slip of the ($S_R$) of the clutch (16).

12. The control method according to claim 11, wherein the clutch torque ($T_C$) is changed by a PID controller (29) which receives, as an input, the control error ($\varepsilon_S$).

13. The control method according to claim 7 and comprising the further steps of:
establishing the clutch torque ($T_C$), which has to be transmitted by the clutch (16) and is equal to the engine torque ($T_E$);
detecting a rotation speed ($\omega_2$) of a driven disc (27) of the clutch (16);
determining a target rotation speed ($\omega_{1-T}$) of a driving disc (26) of the clutch (16) by adding the target slip ($S_T$) of the clutch (16) to the rotation speed ($\omega_2$) of the driven disc (27) of the clutch (16); and
controlling the internal combustion engine (4) so as to change the engine torque ($T_E$) generated by the internal combustion engine (4) so as to pursue the target rotation speed ($\omega_{1-T}$) of a driving disc (26) of the clutch (16).

* * * * *